United States Patent
Shams et al.

(10) Patent No.: US 10,965,984 B1
(45) Date of Patent: Mar. 30, 2021

(54) MINIMIZATION OF VIDEO RE-BUFFERING USING LOCAL ANIMATION

(71) Applicant: Amazon Technologies, Inc., Seattle, WA (US)

(72) Inventors: Khawaja Shams, Portland, OR (US); Timothy Prins, Hillsboro, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/424,200

(22) Filed: May 28, 2019

(51) Int. Cl.
  *H04N 21/44* (2011.01)
  *G06F 16/783* (2019.01)
  *G06F 16/74* (2019.01)
  *H04N 21/84* (2011.01)

(52) U.S. Cl.
  CPC ....... *H04N 21/44004* (2013.01); *G06F 16/74* (2019.01); *G06F 16/783* (2019.01); *H04N 21/84* (2013.01)

(58) Field of Classification Search
  CPC .............. H04N 21/44004; H04N 21/84; G06F 16/783; G06F 16/74
  See application file for complete search history.

(56) References Cited

U.S. PATENT DOCUMENTS

| | | | |
|---|---|---|---|
| 9,888,280 B2 | 2/2018 | Dutta | |
| 9,973,896 B2 | 5/2018 | Barr | |
| 9,979,862 B1 | 5/2018 | Xiong et al. | |
| 9,997,203 B2 | 6/2018 | Marchese | |
| 2006/0182016 A1* | 8/2006 | Walker | H04L 29/06 370/208 |
| 2008/0109556 A1* | 5/2008 | Karlberg | H04N 7/163 709/231 |
| 2013/0054825 A1* | 2/2013 | Mareachen | H04N 21/4325 709/231 |
| 2013/0276041 A1* | 10/2013 | Dutta | H04N 21/4331 725/94 |
| 2014/0380361 A1* | 12/2014 | Baghini | H04N 21/4722 725/37 |

* cited by examiner

*Primary Examiner* — John R Schnurr
(74) *Attorney, Agent, or Firm* — Robert C. Kowert; Kowert, Hood, Munyon, Rankin & Goetzel, P.C.

(57) ABSTRACT

Methods, systems, and computer-readable media for minimization of video re-buffering using local animation are disclosed. A client device stores a portion of a video stream into a video buffer and displays the portion on a display. The stream is received from a media streaming system via one or more networks. The client device discontinues displaying the video stream. The client device generates a visualization of metadata that is displayed on the display while the video stream is not displayed. While the visualization of metadata is displayed on the display, the client device stores a newer portion of the video stream in the video buffer. The client device discontinues displaying the visualization of metadata and resumes displaying the video stream on the display.

18 Claims, 9 Drawing Sheets

MINIMIZATION OF VIDEO RE-BUFFERING USING LOCAL ANIMATION

BACKGROUND

Internet-based media streaming is increasingly the choice of viewers who seek convenient access to video outside of conventional video distribution channels (including over-the-air broadcasts, cable TV, satellite TV, and prerecorded physical media). Using streaming technologies, viewers may access channels of live media (e.g., video) as well as prerecorded media from libraries of media assets that are accessible over an Internet connection. In some cases, streaming media is viewable on a wide range of devices, including desktop computers and laptop computers, tablets, smartphones, wearable computers, and specialized devices such as smart televisions. Additionally, internet-based media streaming may be used to deliver high-quality video from remote content providers to local broadcasters for conventional video distribution to viewers.

The distribution and delivery pipeline for streaming media is typically a complicated one. A media asset or live stream may first be acquired, e.g., from a broadcaster. The media may then be processed and transformed in any of several ways—potentially including compression, encryption, and other forms of encoding—for eventual distribution to viewers. A hierarchy of servers over a wide geographical area may be used to deliver the media to many client devices in an efficient manner. Viewers may attempt to play the streaming media on the client devices. However, the viewer experience may be degraded by a loss of network connectivity, a drop in available network bandwidth, and other problems that result in the client device exhausting the contents of a local video buffer.

Figure 1:
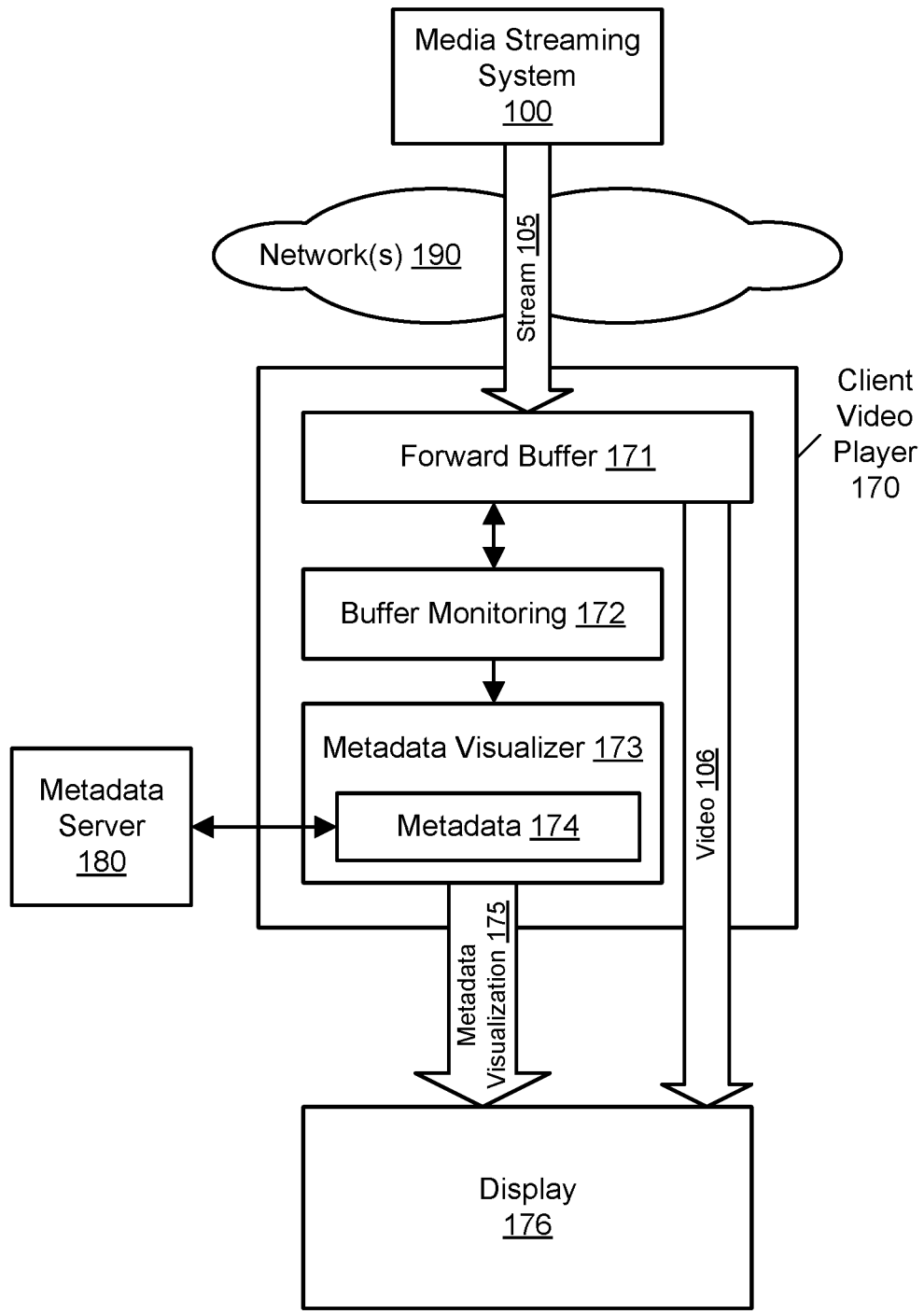
FIG. 1 illustrates an example system environment for minimization of video re-buffering using local animation, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for minimization of video re-buffering using local animation are described. A cloud-based, network-accessible media streaming system may provide streaming media (including video and audio) to client devices on which the media can be played. The streaming media may be provided to the media streaming system by content providers such as broadcasters and distributors. For example, a content provider on-site at a live event may start recording the event with digital video (including audio) and seek to stream the recording to the cloud while the event is ongoing. Via network connections to the media streaming system, the uploaded content may then be delivered to client devices that implement playback of digital media. Newer portions of the stream (e.g., a few seconds of video) may be stored in a forward buffer on a client device before being displayed so that brief interruptions in acquiring the stream do not necessarily cause an interruption in playback. However, longer interruptions or degradations in network connectivity or stream accessibility may cause the client player to run out of playable media in the buffer, even if the client begins acquiring media at a lower bitrate to accommodate a reduction in bandwidth. Such interruptions may be referred to as buffering events and may degrade the viewer experience. For example, during a buffering event, the client player may stop displaying the video stream and instead display a static slate or "spinning wheel" effect to indicate that the stream has been interrupted.

Using the techniques described herein, a client video player may locally generate animations to display during a buffering event. The animations may seek to maintain viewer engagement while the player catches up on the buffer before resuming playback of the stream. While displaying the animation, the player may skip acquisition of one or more segments of the stream, such as segments corresponding to the duration of time for which the animation is displayed. The newest segment(s) of the stream may be requested and acquired at a lower bitrate, e.g., if the client's connection to the media streaming system has been degraded. The player may attempt to acquire enough content in the forward buffer to discontinue display of the animation and resume playback of the stream with a reduced likelihood of re-buffering (e.g., encountering another buffering event) in the near future. The animations may be relevant to the content of the stream and may also be referred to as visualizations of metadata. For example, if the interrupted stream is a live sporting event, then the player may generate and display a visualization of the current score, relevant statistics, real-time play-by-play, scores for other games, and/or other relevant metadata. As another example, if the interrupted stream is a live news broadcast, then the player may generate and display a visualization of current news headlines. The metadata may be acquired by the player using an out-of-band call to a metadata server or may be extracted from the stream itself. Audio playback may continue if the media streaming system remains accessible with reduced bandwidth. Similarly, animations may be locally generated, displayed, and then discontinued based (at least in part) on cues in the stream itself, such as metadata indicating that an advertising slate contains a gap of time without advertising. Local generation and display of animations as described herein may improve the experience of stream viewers and reduce re-buffering rates for streaming media.

As one skilled in the art will appreciate in light of this disclosure, embodiments may be capable of achieving certain technical advantages, including some or all of the following: (1) improved Quality-of-Service (QoS) metrics such as re-buffering rates for streaming media players by allowing client players to refill forward buffers while a visualization is being displayed instead of the stream; (2) improved use of network bandwidth by skipping the acquisition of one or more segments of a media stream while a visualization is being displayed instead of the stream; (3) improved use of network bandwidth by acquiring up-to-date segments of a media stream at a lower bitrate while a visualization is being displayed instead of the stream; and so on.

FIG. 1 illustrates an example system environment for minimization of video re-buffering using local animation, according to some embodiments. A media streaming system 100 may provide a stream 105, such as digital video with audio, to a client video player 170 for playback using the player. The client video player 170 may be implemented using resources of a client computing device. The stream 105 may be acquired by the player 170 over one or more networks 190 that couple the client computing device to the media streaming system 100. All or part of the media streaming system 100 may be hosted "in the cloud" and may provide the same stream or different streams to many instances of the client player 170. The client video player 170 may request the particular stream 105 from the media streaming system 100, and in response to the request, the media streaming system may begin sending segments of the requested stream to the player. Different segments of the stream 105 may be sent over time. The client video player 170 may request the stream 105 at a particular bitrate, and the requested bitrate may change over time. For example, the requested bitrate may be reduced for future segments of the stream 105 in response to a reduction in network bandwidth or may be increased for future segments of the stream in response to an increase in available bandwidth.

The client video player 170 may include or have access to a memory resource referred to as a forward buffer 171. The forward buffer 171 may store the most recently received segment(s) of the stream 105. For example, the forward buffer 171 may include sufficient memory to store a few seconds of video at the typical bitrate of the player 170. The player 170 may read video 106 from the forward buffer 171 and provide it to a display device 176 for playback. The display device 176 may be part of the client computing device or may instead be accessible by the client over a local connection. If the video 106 is associated with audio, then the audio may similarly be provided to one or more speakers or other audio playback device(s). Displayed video 106 may be deleted from the buffer 171 to make room for newer segments. The process of storing newly received segments of media into the forward buffer 171, displaying video 106 taken from the buffer, and deleting that video from the buffer may be performed repeatedly as long as the stream 105 is being received via a healthy connection.

The use of the buffer 171 may permit the player 170 to continue displaying video 106 even if brief interruptions are encountered in acquiring the stream. Such interruptions may often be caused by a degraded or completely dropped network connection. The player 170 may include a component 172 for buffer monitoring that determines the current status of the buffer and its contents. If the buffer 171 begins to run out of video due to an interruption in the network(s) 190, then the buffer monitoring 172 may detect that the amount of media held by the buffer is less than some predetermined threshold amount. The threshold amount may be expressed as a number of seconds of buffered video, as a percentage of the buffer, or in any other suitable units. Such a status of the buffer 171 may be referred to as a buffering event. For example, if the buffer has capacity for five seconds of video, but the buffer has been reduced to only two seconds of content, then the buffer monitoring 172 may determine that a buffering event has occurred and may trigger one or more actions to mitigate the effects of the buffering event. In one embodiment, the player 170 may react to a buffering event by requesting future segments of the stream 105 at a lower bitrate to account for a reduction in network bandwidth.

In one embodiment, the player 170 may react to a buffering event by skipping one or more segments of the stream 105 and acquiring enough future segments to resume buffered playback. The future segments may be requested and acquired at a lower bitrate (e.g., if the network connection has seemingly been degraded) or at the same bitrate (e.g., if the network connection was briefly dropped but eventually resumed at full health). By skipping one or more segment(s) while allowing the buffer 171 to catch up on the stream, the player 170 may minimize the likelihood of re-buffering or encountering another buffering event in the near future. While the one or more segment(s) are skipped, video playback may be discontinued. In one embodiment, audio playback may continue if the media streaming system 100 remains accessible with sufficient bandwidth to acquire the audio.

During the period of time when the player 170 is skipping one or more stream segments in order to fill the buffer 171, the player 170 may stop displaying the video 106 and instead display a locally rendered animation using the display device 176. The animation may also be referred to as a visualization. Such animations or visualizations may seek to maintain viewer engagement while the player catches up on the buffer before resuming playback of the stream. The animations or visualizations may be generated or rendered dynamically. In one embodiment, an animation or visualization may be rendered by the client in response to detecting a buffering event or other cue. In one embodiment, an animation or visualization may be rendered by the client after the player 170 begins acquiring the stream 105. In one embodiment, an animation or visualization (or at least a portion thereof) may be rendered by the client before a buffering event or other cue, and display of the animation or visualization may be triggered by the buffering event or cue.

The player 170 may include a metadata visualizer 173 that produces a visualization 175 based (at least in part) on metadata 174. A visualization 175 may include textual elements, graphical elements, or a combination thereof. A visualization 175 rendered by the visualizer 173 may be static or animated. A visualization 175 may be relevant to the specific content or nature of the stream 105. For example, if the interrupted stream is a live sporting event, then the player 170 may generate and display a visualization of the current score or status, relevant statistics for the teams or athletes involved, real-time play-by-play of the event, scores for related events, and/or other relevant metadata. The metadata 174 may thus represent a score or status of the event, play-by-play information, scores for related events, and so on. As another example, if the interrupted stream is a live news broadcast, then the player 170 may generate and display a visualization of current news headlines. Local generation and display of animations as described herein may improve the experience of stream viewers and reduce re-buffering rates for streaming media. In one embodiment, the player 170 may minimize a QoS metric such as Zero Buffer Rate (ZBR) by skipping video segments and playing locally rendered animations in an attempt to ensure that the forward buffer never runs out of content.

In one embodiment, the metadata 174 may be acquired in advance of a buffering event, e.g., so that the player 170 can generate the visualization 175 even after a total loss of network connectivity. In one embodiment, the metadata 174 may be acquired in response to the buffering event or other cue to display the metadata visualization 175. In one embodiment, the metadata 174 may be acquired by the player 170 using an out-of-band call to a metadata server 180. The metadata server 180 may represent a cloud-based and/or network-accessible resource and may or may not be associated with the media streaming system 100. The metadata server 180 may implement an application programming interface (API) that permits the player 170 to submit a request for metadata that is relevant to the stream 105. For example, if the stream 105 represents a live sporting event between two teams, then the metadata server 180 may be associated with a search engine that can report current scores, and the out-of-band call to the metadata server may indicate the two teams and request the current score. In one embodiment, the player 170 may send the same or similar request to different metadata servers and may use one or more of the results for the visualization. For example, if the stream 105 represents a live sporting event between two teams, then the highest score received from the different metadata servers may be assumed to be the most up-to-date and may be visualized. In one embodiment, the player 170 may have a hierarchy or list of metadata servers that can be contacted in case one or more of the servers are unavailable or unresponsive.

In some embodiments, visualizations 175 may be tailored for individual viewers or groups of viewers. Visualizations may be adapted for particular users based (at least in part) on historical data regarding user requests, user interaction, and/or other engagement metrics or contextual information. For example, if a particular user or category of users has shown a preference (explicitly or implicitly) for one type of visualization over another, then that type may be selected for that user or category of users for future visualizations. Similarly, if a user or user group has tended to discontinue viewing for one type of visualization, then that visualization may be given a lower prioritization in selecting future visualizations. Such contextual data may be collected by client players 170 for one or more clients, reported to a backend component (e.g., a component associated with the media streaming system 100 or metadata server 180), analyzed by the backend component (e.g., using machine learning techniques), and then used to influence the rendering of future visualizations by clients. In one embodiment, the context associated with a user may be determined locally and used to influence the generation of a visualization without necessarily being reported to an external component. For example, if the user has enabled a user-facing camera, and the camera captures video that expresses dissatisfaction with the currently displayed visualization, then a different type of visualization may be displayed in an attempt to maintain viewer engagement. Similarly, the visualizer 173 may cycle through different types of visualizations based (at least in part) on explicit disapproval of visualizations by the user, e.g., by the user selecting a "thumbs down" icon on the display. In some embodiments, visualizations 175 may be tailored for the content of specific types of streams 105. For example, a visualization for a baseball game, a visualization for a basketball game, a visualization for a news broadcast, and a visualization for a concert may differ from one another in terms of the type of information presented, the graphical elements of the visualization, and so on.

Figure 2:
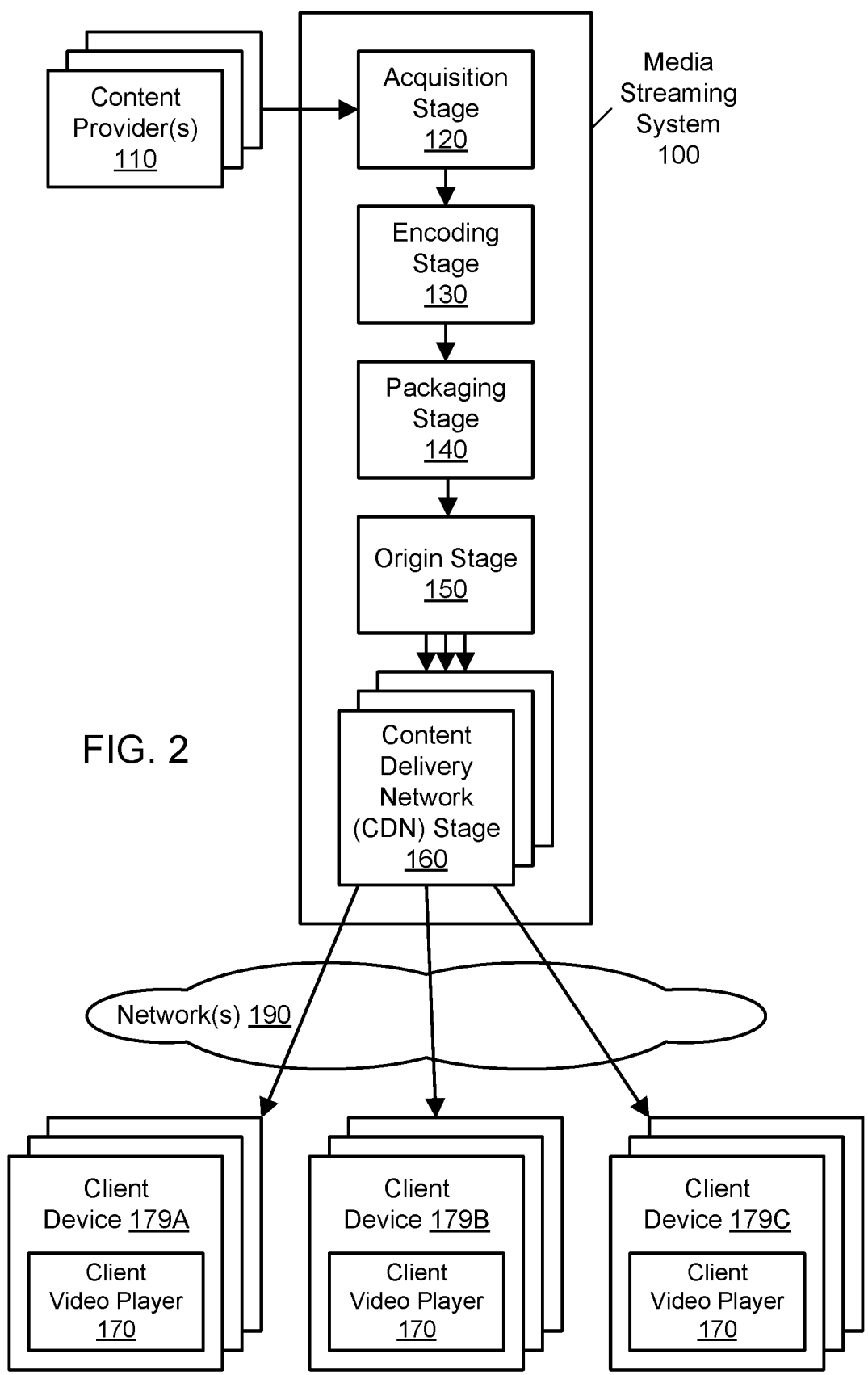
FIG. 2 illustrates further aspects of the example system environment for minimization of video re-buffering using local animation, including stages of a media streaming system that provides a stream to a client video player, according to some embodiments.

FIG. 2 illustrates further aspects of the example system environment for minimization of video re-buffering using local animation, including stages of a media streaming system that provides a stream to a client video player, according to some embodiments. A media streaming system 100 may implement a media delivery pipeline to stream media, such as digital video or audio or a combination thereof, to client computing devices 179A-179C for playback using those devices. The media may represent live media content (e.g., a live stream associated with a particular channel) or prerecorded media content (e.g., a media asset from a library of streamable media). The pipeline may include multiple stages; the stages may represent various transformations of the media and/or various distribution paths for the media (e.g., from device to device over the internet). A media stream may comprise a multichannel media stream in which multiple channels of content are packaged together. The multiple channels may typically represent different content, and a recipient may select one of the channels from the multichannel stream (e.g., for viewing). Alternatively, a media stream may comprise a single channel of media. A particular channel of streaming video may be provided at different bitrates to account for differences in available bandwidth and/or client capabilities. Video and audio may be combined in a particular stream of media, potentially with other data such as captioning data. A particular channel of streaming video may be packaged with one or more audio tracks, and a client player may select one of the audio tracks for playback.

The client computing devices 179A-179C may be associated with and/or operated by one or more clients of the media streaming system 100; as used herein, the terms "client computing device," "client device," and "client" may be used interchangeably. The client computing devices 179A-179C may be coupled to portions of the media streaming system 100 via one or more networks, potentially including the Internet. A client may represent a customer (e.g., an individual or group) of the media streaming system 100. Typically, a user associated with one of the client computing devices 179A-179C may have an account that has privileges to access media content provided by the media streaming system 100. The access may be fee-based or may instead be free to the user (potentially with advertisements in the streaming media or player software). However, some media may also be streamable to users without accounts or other arrangements, e.g., on web sites that provide streaming video.

It is contemplated that the media delivery pipeline implemented by the media streaming system 100 may include various combinations of stages, including the particular combination illustrated in FIG. 2 for purposes of example. In one embodiment, as shown in FIG. 2, the stages of the pipeline may include an acquisition stage 120, an encoding stage 130, and a packaging stage 140. At the acquisition stage 120, a signal representing the media may be acquired from one or more content providers 110, e.g., broadcasters. The signal may be acquired by the media streaming system 100 using any of several suitable transport mechanisms, including a serial digital interface (SDI), a camera feed, a microphone feed, an internet protocol (IP) connection, an asynchronous serial interface (ASI) connection, and so on. At the encoding stage 130, the media may be transformed into a particular video or audio format, e.g., using a particular codec. The encoding stage may be implemented by a plurality of components, referred to herein as encoders, that may operate in parallel. The encoders may differ in terms of the encoding tasks they perform. The encoding stage 130 may include compression, or a separate compression stage may be used in the pipeline. Additionally, at the encoding stage 130, the media may be divided into segments or chunks of a fixed or variable size. For example, the media may be divided into segments of approximately ten seconds in length for delivery via HTTP over TCP/IP.

Downstream from the encoding stage 130, the media may be processed further and distributed to one or more clients 179A-179C. At the packaging stage 140, the media may be packaged and multiplexed (or "muxed") for playback on particular playback software (referred to herein as a "player") and/or a particular type of client device (e.g., a particular smartphone, tablet, set-top box, smart home device, smart television, etc.). In one embodiment, additional stages or sub-stages of the pipeline may perform additional transformations of the media, such as encryption performed at an encryption stage, decoding performed at a decoding stage, scaling performed at a scaling stage, advertisement insertion performed at an advertisement insertion stage, and/or other types of image processing (e.g., color transformation) performed at an image processing stage. Alternatively, one of the additional transformations may be performed as a sub-stage of another stage such as the encoding stage 130.

In one embodiment, as shown in FIG. 2, the stages may include an origin server stage (also referred to as an origin stage) 150 and a content delivery network (CDN) stage 160. The pipeline may include one or more origin servers and a larger number of CDN servers. The origin server(s) may act as distribution points to the CDN servers. The CDN servers may be located closer to clients in terms of geography and/or network latency in order to provide efficient distribution of the media. A single origin server may provide a media stream to many CDN servers, and each CDN server may then respond to requests for media from many client devices. In some cases, such as for prerecorded media, the origin server may persistently store the media (or segments thereof) for an indefinite period of time, while the CDN servers may cache segments of the media for a more limited period of time. If a client requests particular content that is not available in the cache at a CDN server, then the CDN server may request the content from the origin server and then deliver the content to the requesting client. At the origin server stage 150, the media may be sent from the origin server to one or more CDN servers. If other stages such as the acquisition stage 120, encoding stage 130, and/or packaging stage 140 are performed at the origin server, then the origin stage 150 may include those stages or include corresponding sub-stages. However, it is also contemplated that the origin server stage 150 may represent a distinct stage relative to the acquisition stage 120, encoding stage 130, and/or packaging stage 140. At the CDN stage 160, the media may be sent from a CDN server to a client device, e.g., as requested by the client device. In one embodiment, the stages may also include a playback stage that represents attempted playback by a player (e.g., implemented in player software) on a client device using a client video player 170.

The implementation of the client video player 170 may vary based (at least in part) on the type of client device (e.g., a particular smartphone, tablet, set-top box, smart home device, smart television, etc.). In one embodiment, the type of visualization 175 may vary based (at least in part) on the type of client device. For example, a less capable device may include a player 170 that merely displays the current score of a game using text, while a more capable device may include a player that displays a graphical visualization of current play-by-play in the game. In the example of FIG. 2, client devices 179A may represent a device type with different hardware capabilities than client devices 179B or 179C, client devices 179B may represent a device type with different hardware capabilities than client devices 179A or 179C, and client devices 179C may represent a device type with different hardware capabilities than client devices 179A or 179B.

In some embodiments, components of the media streaming system 100 such as servers, storage resources, and network resources may be implemented using resources of a provider network. The provider network may be set up by an entity such as a business or public-sector organization to provide one or more services (such as various types of cloud-based computing or storage) accessible via the Internet and/or other networks to clients. The provider network may include numerous data centers hosting various resource pools, such as collections of physical and/or virtualized computer servers, storage devices, networking equipment and the like (e.g., implemented using the example computing system 700 described below with regard to FIG. 7), needed to implement and distribute the infrastructure and services offered by the provider network. In some embodiments, the provider network may provide computing resources and services, such as services associated with the media streaming system 100; storage services, such as a block-based storage service, key-value based data stores, or various types of database systems; and/or any other type of network-based services. Clients may access these various services offered by the provider network via one or more networks, potentially including the Internet. Likewise, network-based services may themselves communicate and/or make use of one another to provide different services. For example, computing resources offered in units called "instances," such as virtual or physical compute instances or storage instances, may make use of particular data volumes, providing virtual block storage for the compute instances.

The provider network may implement or provide a multi-tenant environment such that multiple clients (e.g., content providers 110 and/or clients 179A-179C) may access or use a particular resource or service in a substantially simultaneous manner. Functionality of all or part of the media streaming system 100 may be offered to multiple clients (in a substantially simultaneous manner) in such a multi-tenant provider network, such that the same computational and storage resources associated with the media streaming system may be used on behalf of different clients over the same window of time. The different clients may represent different individuals and/or different organizations that may pay the provider network for access to one or more services and/or resources. The provider network may include a fleet of computing devices, also referred to herein as servers, hosts, or instances, which are configured to execute software on behalf of clients of the provider network. In one embodiment, a fleet of servers may grow or shrink as individual servers are provisioned or deprovisioned using resources of the provider network. In one embodiment, the fleet of servers may grow or shrink as individual servers are added to or removed from a dedicated fleet by an administrator.

The content providers 110 may be individuals or entities who provide streaming media content to the media streaming system 100 for potential delivery to the clients 179A-179C. The content providers 110 as illustrated in FIG. 2 may correspond to computing devices that are connected to the media streaming system 100 over one or more networks, potentially including the Internet. The computing devices associated with the content providers 110 may encompass any type of hardware and software that are configurable to submit requests to the media streaming system 100 (e.g., implemented using the example computing system 700 described below with regard to FIG. 7). Similarly, the computing devices associated with the clients 179A-179C may encompass any type of hardware and software that are configurable to consume streaming media provided by the media streaming system 100 (e.g., implemented using the example computing system 700 described below with regard to FIG. 7). For example, a client computing device may implement the client video player 170 using a dedicated media player, a suitable version of a web browser, and/or a plug-in module or other type of code module configured to execute as an extension to or within an execution environment provided by a web browser or other form of client software. In some embodiments, such a client application 170 may include sufficient protocol support (e.g., for a suitable version of Hypertext Transfer Protocol [HTTP]) for generating and processing network-based service requests.

Content providers 110 and/or client computing devices 179A-179C may convey network-based requests to the media streaming system 100 via one or more external networks, such as network(s) 190. In various embodiments, the external network(s) 190 may encompass any suitable combination of networking hardware and protocols necessary to establish network-based communications between computing devices and the media streaming system 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given computing device and the media streaming system 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given computing device and the Internet as well as between the Internet and the media streaming system 100. It is noted that in some embodiments, computing devices for content providers 110 and/or clients 179A-179C may communicate with the media streaming system 100 using a private network in addition to or instead of the public Internet.

Figure 7:
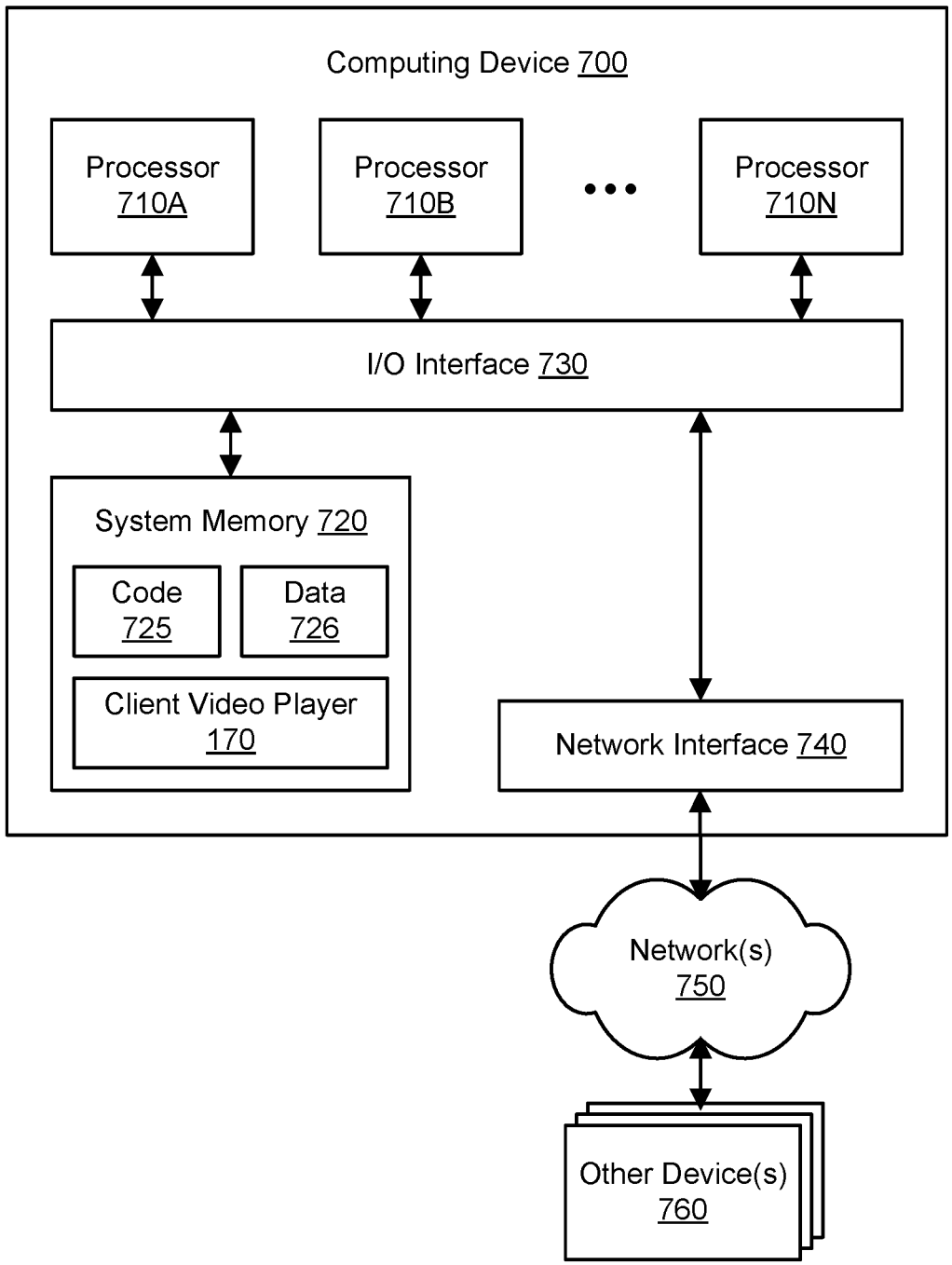
FIG. 7 illustrates an example computing device that may be used in some embodiments.

The media streaming system 100 may include a plurality of computing devices, any of which may be implemented by the example computing device 700 illustrated in FIG. 7. In various embodiments, portions of the described functionality of the media streaming system 100 may be provided by the same computing device or by any suitable number of different computing devices. If any of the components of the media streaming system 100 are implemented using different computing devices, then the components and their respective computing devices may be communicatively coupled, e.g., via a network. Each of the illustrated components (such as the various stages 120, 130, 140, 150, and 160) may represent any combination of software and hardware usable to perform their respective functions. Multiple computing devices may typically be used to implement the multi-stage pipeline. In some circumstances, more than one stage may be performed by the same computing device.

It is contemplated that the media streaming system 100 may include additional components not shown, fewer components than shown, or different combinations, configurations, or quantities of the components shown. For example, although various stages such as stages 120, 130, 140, 150, and 160 are shown for purposes of example and illustration, it is contemplated that different quantities and configurations of stages may be used. Additionally, it is contemplated that some of the stages 120, 130, 140, 150, and 160 may include redundant components that collectively provide the functionality of the particular stage. Aspects of the functionality described herein may be performed, at least in part, by components outside of the media streaming system 100.

Figure 3A:
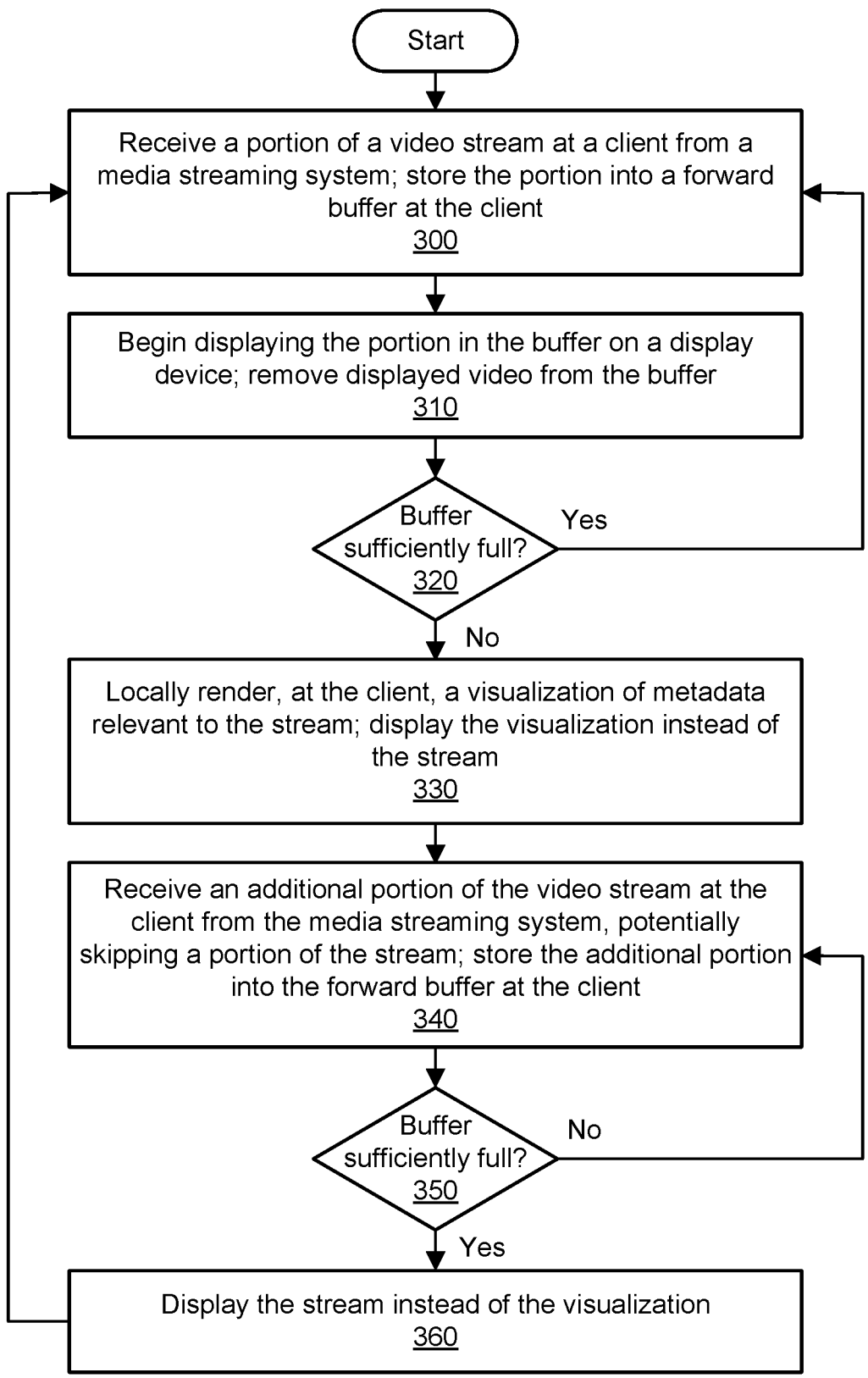
FIG. 3A and FIG. 3B are flowcharts illustrating methods for minimization of video re-buffering using local animation, according to some embodiments.
Figure 3B:
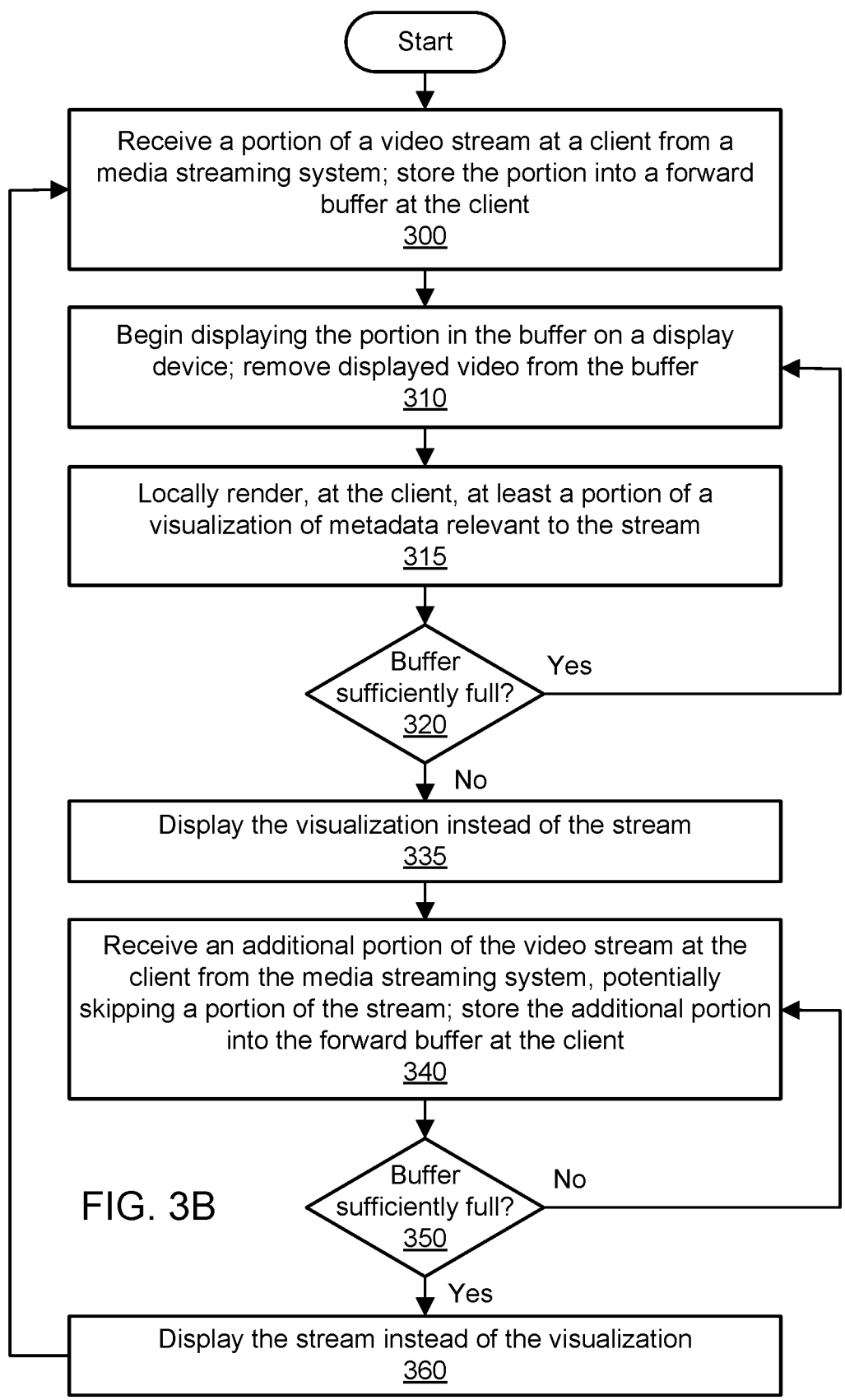

FIG. 3A and FIG. 3B are flowcharts illustrating method for minimization of video re-buffering using local animation, according to some embodiments. As shown in 300, a portion of a video stream may be received at a client device from a media streaming system. The portion may represent one or more frames, one or more segments, or any other quantity of information. The portion may represent a first period of time of the stream. The portion may be stored into a forward buffer at the client device. As shown in 310, the method may begin displaying the portion of video in the buffer on a display device associated with the client device. Displayed video may be removed from the buffer.

As shown in 320, the method may determine whether the buffer is sufficiently full or whether a buffering event is taking place. The buffer may become insufficiently full, for example, if a network connection between the client device and the media streaming system is dropped or suffers a reduction in available bandwidth. If the buffer begins to run out of video due to an interruption in the network, then the client player may detect that the amount of media held by the buffer is less than some predetermined threshold amount. The threshold amount may be expressed as a number of seconds of buffered video, as a percentage of the buffer, or in any other suitable units. The client player may monitor the status of the buffer and detect such buffering events. If no buffering event is detected, then as long as the stream continues to be provided and as along as the viewer continues watching, the method may continue with the operation shown in 300.

If a buffering event is detected, then as shown in 330, the client may locally render an animation or visualization of metadata relevant to the stream. The client may display the animation or visualization on the display device instead of video from the stream. The animation or visualization may be displayed instead of a spinning circle or conventional indicator that buffering is taking place. Such animations or visualizations may seek to maintain viewer engagement during the buffering event. An animation or visualization may be generated or rendered dynamically, e.g., in response to the buffering event. An animation or visualization may include textual elements, graphical elements, or a combination thereof. An animation or visualization may be static or animated. An animation or visualization may be relevant to the specific content or nature of the stream. For example, if the interrupted stream is a live sporting event, then the player may generate and display a visualization of the current score or status, relevant statistics for the teams or athletes involved, real-time play-by-play of the event, scores for related events, and/or other relevant metadata. As another example, if the interrupted stream is a live news broadcast, then the player may generate and display a visualization of current news headlines. In various embodiments, the metadata that is visualized may be acquired by the player using an out-of-band call to a metadata server in response to the buffering event, may be seeded at the start of the stream, or may be extracted from the stream itself.

As shown in 340, the client may receive an additional portion of the stream from the media streaming system. While the additional portion is received, the animation or visualization may be displayed. The additional portion may represent one or more frames, one or more segments, or any other quantity of information. In one embodiment, the client may skip a portion of the stream between the portion referred to in 300 and the additional portion referred to in 340. The skipped portion may represent a second period of time of the stream, and the additional portion may represent a third period of time of the stream. The additional portion may be stored into the forward buffer at the client device. The additional portion may be requested and acquired at a lower bitrate (e.g., if the network connection has seemingly been degraded) or at the same bitrate (e.g., if the network connection was briefly dropped but eventually resumed at full health).

As shown in 350, the method may determine whether the buffer is sufficiently full or whether the buffering event is over. If the buffer has not been refilled with a sufficient amount of video to resume buffered playback, then the method may continue with the operation shown in 340. However, if the buffering event is over, then as shown in 360, the client may resume displaying the video from the stream and may discontinue displaying the animation or visualization. By skipping one or more segment(s) while allowing the buffer to catch up on the stream, the player may minimize the likelihood of re-buffering or encountering another buffering event in the near future.

In the example illustrated in FIG. 3B, the rendering of the visualization may occur (at least in part) before the buffering event. As shown in 315, the client may locally render the visualization before the buffering event (or other cue) is detected. For example, a more detailed or complex visualization may require more rendering time and may be generated in advance of the need to display it. In one embodiment, the visualization may be rendered after the start of the stream, as shown in FIG. 3B. In one embodiment, the visualization may be rendered locally at the client before the start of the stream. As shown in 335, if a buffering event (or other cue) is detected, then the client may then display the animation or visualization on the display device instead of video from the stream. In one embodiment, a portion of the visualization may be rendered at the client before the buffering event or cue to display the visualization, and another portion may be rendered after the buffering event or cue to display the visualization. For example, a previously rendered visualization may be updated with a current status of a live event (e.g., the score of a game) and then displayed in response to a buffering event.

FIG. 4A, FIG. 4B, FIG. 4C, and FIG. 4D illustrate examples of metadata visualizations usable for minimization of video re-buffering using local animation, according to some embodiments. In the example shown in FIG. 4A, a metadata visualization 175A is generated locally by the client player 170 and displayed on the display device 176. The stream 105 may represent a sporting event between two teams, and the visualization 175A may show the current score. In particular, the visualization 175A may indicate the first team name 401 and its current score 411 along with the second team name 402 and its current score 412. The visualization 175A may include textual elements such as team names, graphical elements such as team logos, or a combination thereof. The visualization 17A may be static or animated, e.g., such that the textual elements or team logos move around the screen.

Figure 4A:
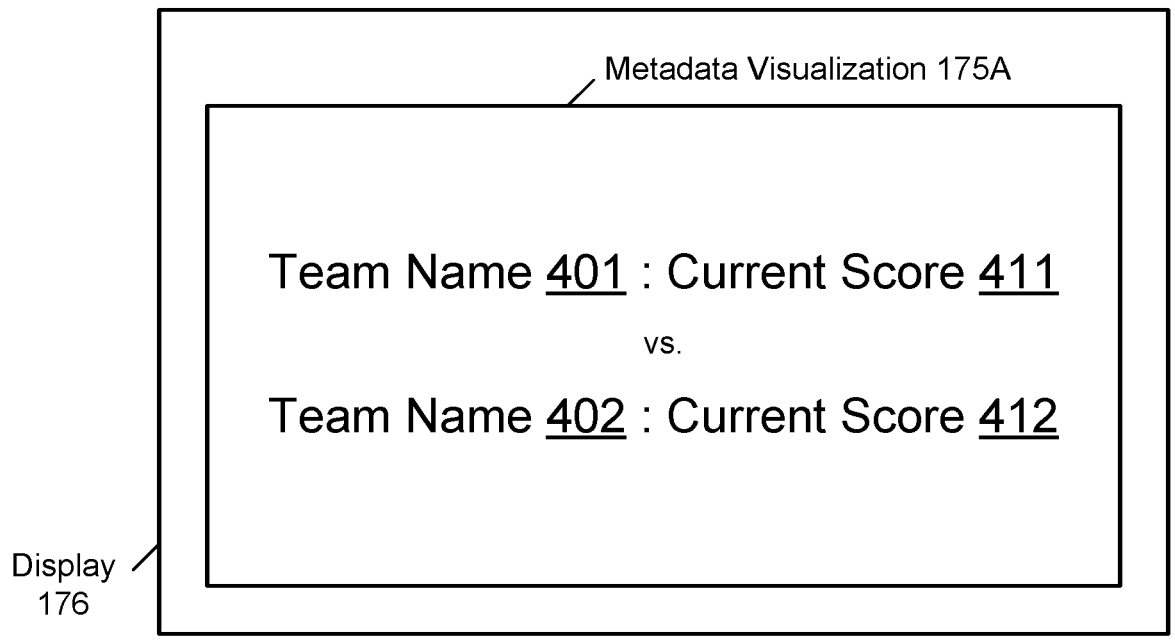
FIG. 4A, FIG. 4B, FIG. 4C, and FIG. 4D illustrate examples of metadata visualizations usable for minimization of video re-buffering using local animation, according to some embodiments.
Figure 4B:
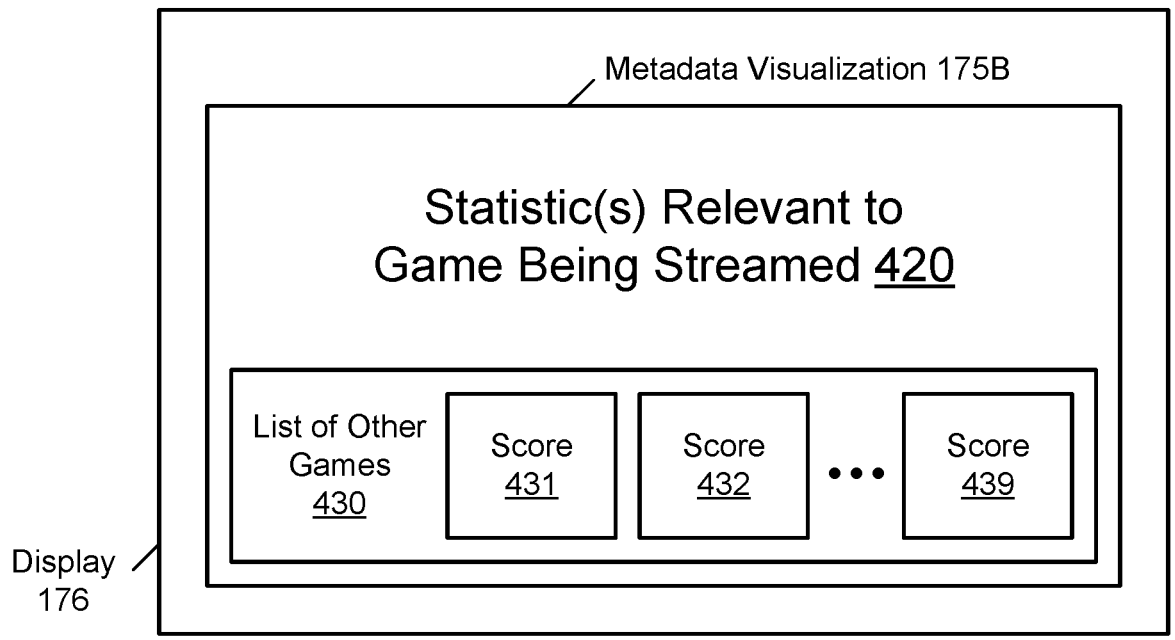

In the example shown in FIG. 4B, a metadata visualization 175B is generated locally by the client player 170 and displayed on the display device 176. The stream 105 may represent a sporting event between two teams, and the visualization 175B may show one or more statistics 420 relevant to the game being streamed. For example, the statistic(s) 420 may include the current score, the likelihood of victory for one team, historical statistics for matchups between the two teams, and so on. For a baseball game, the statistics 420 may include conventional baseball statistics such as batting averages for individual batters or teams, earned run averages for individual pitchers or teams, and so on. Additionally, the visualization 175B may show information related to other ongoing or recently completed games 430. For example, if the current event is a baseball game, then the list of other games 430 may indicate one score 431 for another game, another score 432 for another game, and yet another score 439 for yet another game.

Figure 4C:
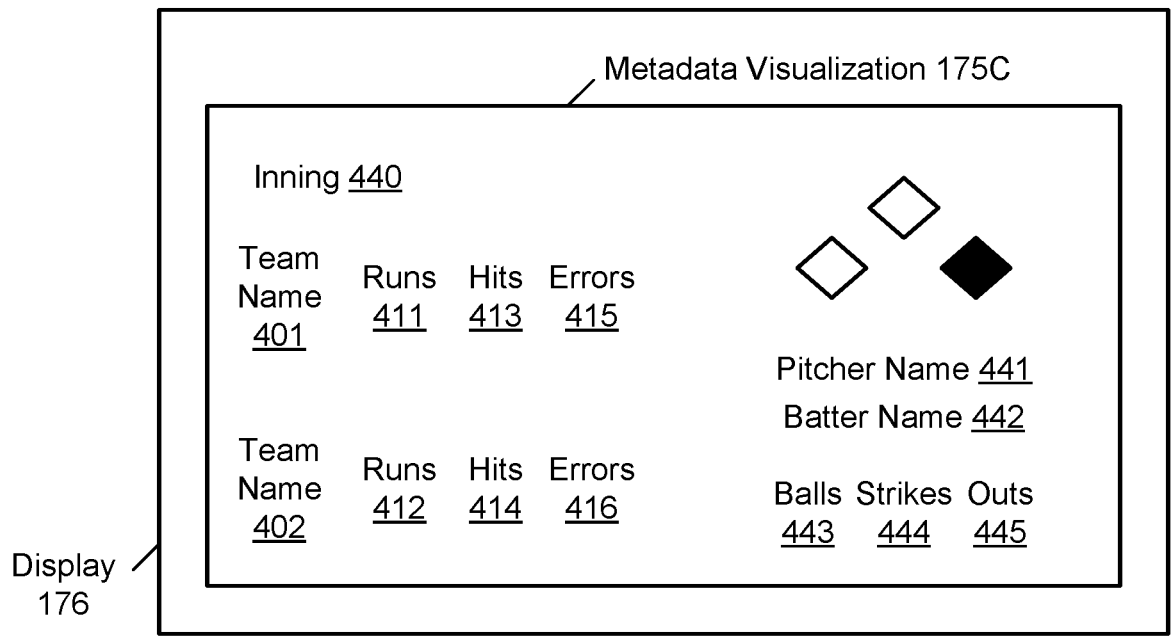

In the example shown in FIG. 4C, a metadata visualization 175C is generated locally by the client player 170 and displayed on the display device 176. The stream 105 may represent an ongoing baseball game, and the visualization 175C may show the current score as well as additional information related to a play-by-play or game status. In particular, the visualization 175C may indicate the first team name 401 and its current score 411 and its hits 413 and errors 415 along with the second team name 402 and its current score 412 and its hits 414 and errors 416. The visualization 175C may indicate additional status information such as the current half-inning 440, the name of the pitcher 441 on the mound, the name of the batter 442 at the plate, the balls 443 and strikes 444 for the pitcher-batter matchup, the number of outs 445 in the half-inning, and whether or not each base is occupied by a baserunner. The visualization 175C may include textual elements such as team names and statistics as well as graphical elements such as player photos, or a combination thereof. The visualization 175C may be static or animated, e.g., such that baserunners are depicted as moving between bases. In one embodiment, the visualization 175C may leverage a rendering engine on the client device (if available) to generate even more detailed, high-resolution animations. The visualization 175C may vary based (at least in part) on the capabilities of the client device.

Figure 4D:
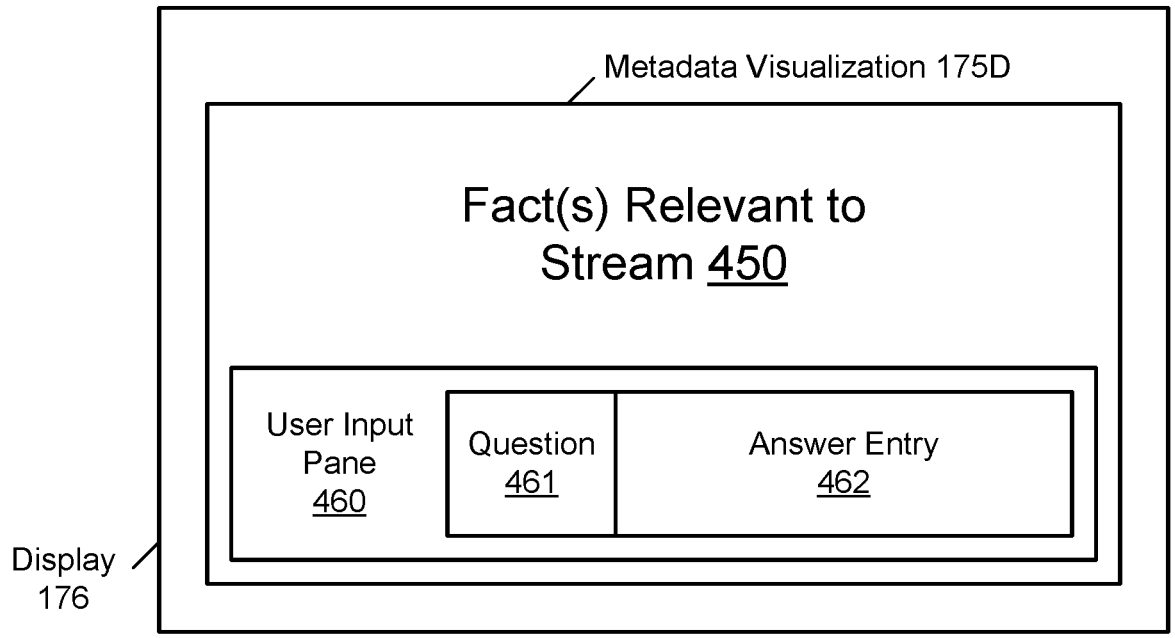

In the example shown in FIG. 4D, a metadata visualization 175D is generated locally by the client player 170 and displayed on the display device 176. The visualization 175D may indicate one or more facts relevant to the stream 450. For example, if the stream 105 represents a sporting event, then the fact(s) 450 may represent statistics regarding the two teams. As another example, if the stream 105 represents a news broadcast, then the fact(s) 450 may represent up-to-date headlines, election results, and so on. As yet another example, if the stream 105 represents a concert or other live performance, then the fact(s) 450 may represent information regarding the performer(s). In one embodiment, the visualization 175D may also include an interactive element such as a user input pane 460. The user input pane may present a question 461 and solicit an answer from the viewer using an interface element for answer entry 462. For example, the user input pane 460 may ask viewers to predict an outcome of the event in the stream. In one embodiment, answers from viewers may be sent back to a component such as the metadata server 180, aggregated, and reported back for future metadata visualization. For example, the fact(s) 450 may represent poll results from a prior question 461.

Figure 5:
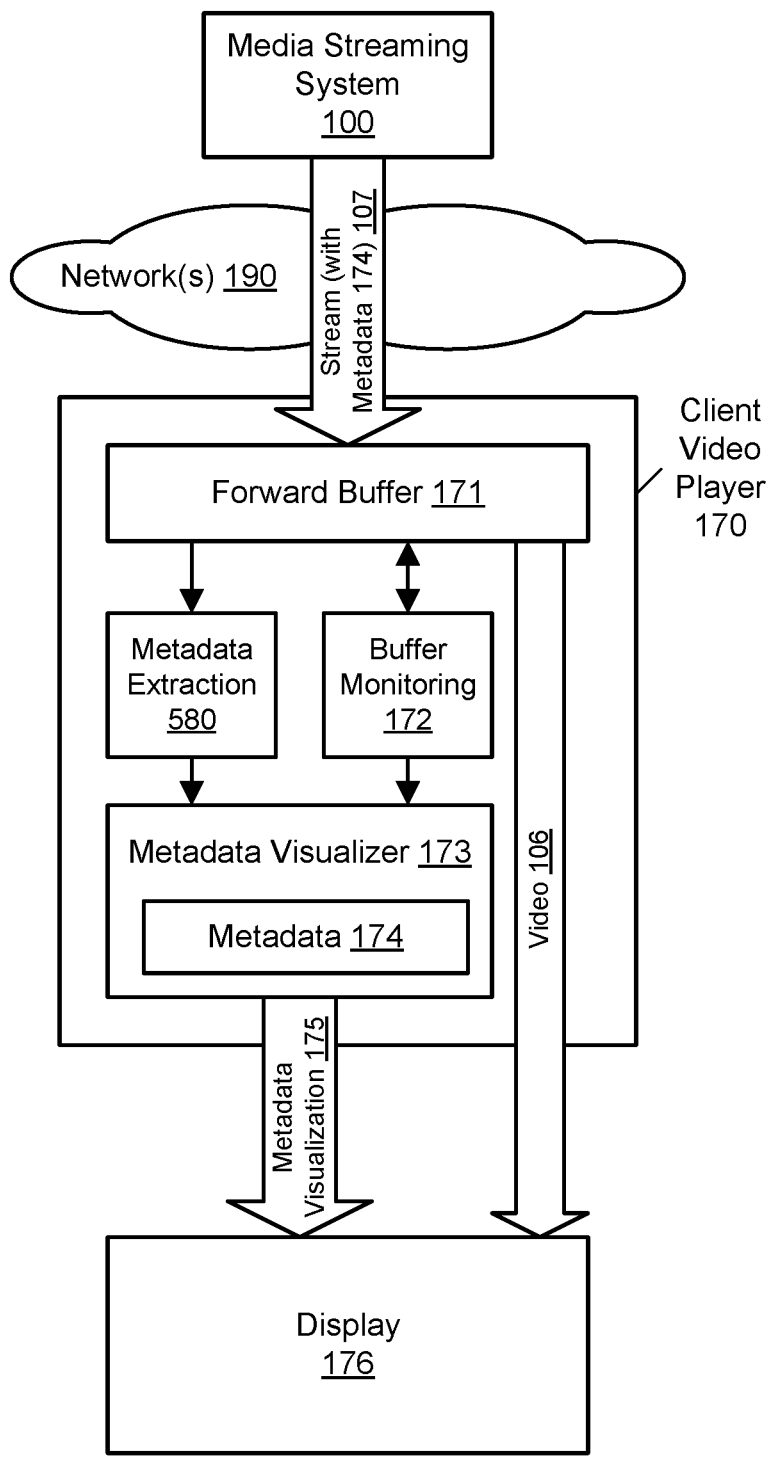
FIG. 5 illustrates further aspects of the example system environment for minimization of video re-buffering using local animation, including extraction of metadata from the stream, according to some embodiments.

FIG. 5 illustrates further aspects of the example system environment for minimization of video re-buffering using local animation, including extraction of metadata from the stream, according to some embodiments. In one embodiment, the stream 107 may include embedded metadata that can be visualized, and the player 170 may acquire the metadata 174 from the stream itself. As shown in FIG. 5, the player 170 may include a component 580 for metadata extraction. The metadata extraction 580 may use the stream (including metadata) 107 as an input and may extract relevant metadata 174 from the stream. In one embodiment, the metadata 174 may be extracted while the connection over the network(s) 190 is healthy, e.g., before a buffering event is encountered. In one embodiment, different portions of the metadata 174 may be extracted at different times. For example, if the stream 107 represents a team sports event, then photos and statistics regarding individual players may be seeded as metadata 174 at the start of the stream, while score changes and other real-time updates may be provided as metadata later in the stream. In one embodiment, metadata updates such as score changes may be provided at relevant times during the stream, such that visualizations may reflect the state of the stream at the time of the buffering event and real-time updates are not necessarily displayed if viewer has paused the stream or started late.

Figure 6:
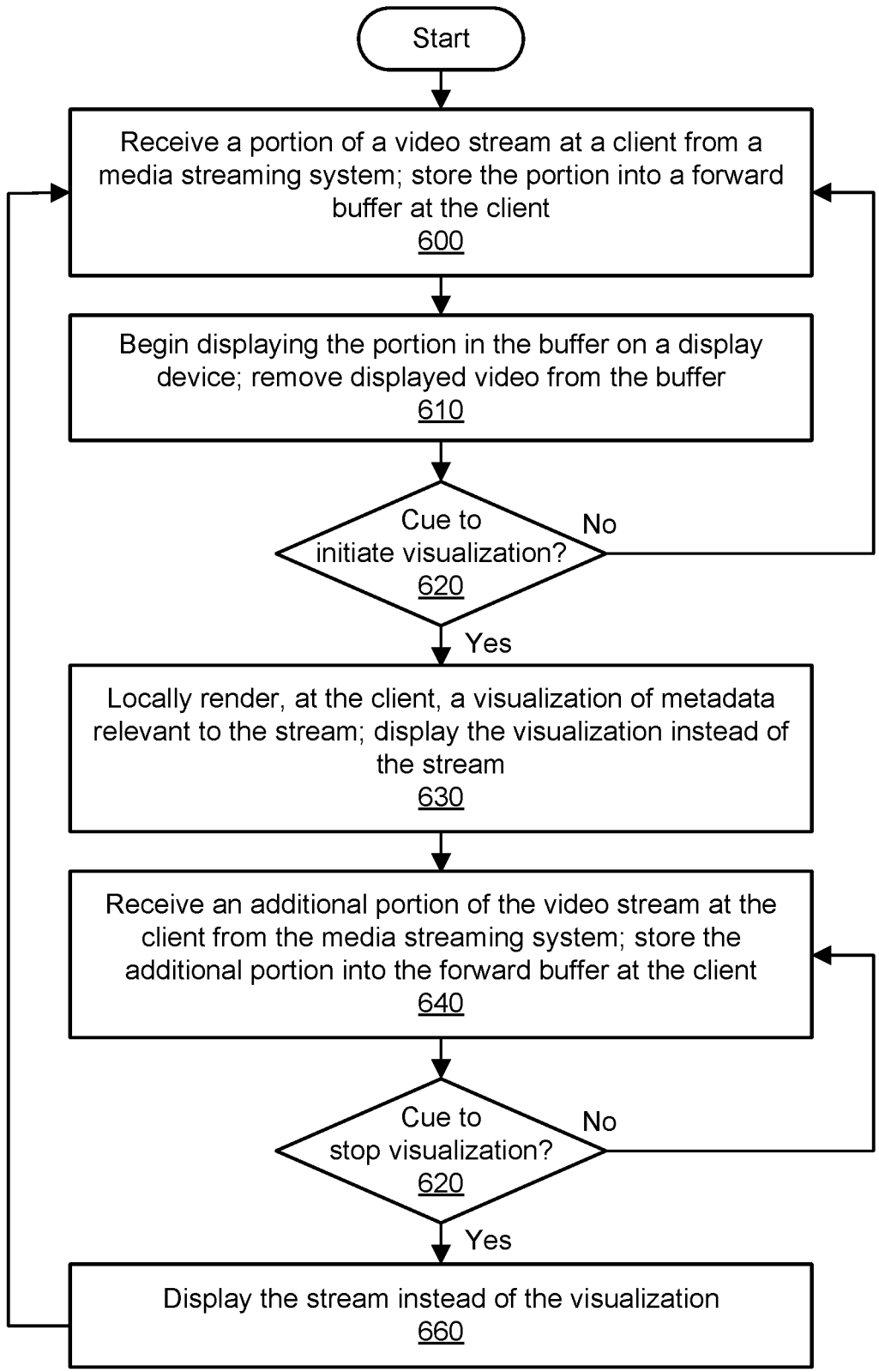
FIG. 6 is a flowchart illustrating a method for minimization of video re-buffering using local animation, including displaying a metadata visualization in response to a cue in the stream, according to some embodiments.

FIG. 6 is a flowchart illustrating a method for minimization of video re-buffering using local animation, including displaying a metadata visualization in response to a cue in the stream, according to some embodiments. In some embodiments, animations or visualizations may be locally generated, displayed, and then discontinued based (at least in part) on cues in the stream itself. For example, the cues may represent metadata in the stream that indicates the beginning and end of a gap in an advertising slate. The player may fill the gap with a locally rendered animation or visualization.

As shown in 600, a portion of a video stream may be received at a client device from a media streaming system. The portion may represent one or more frames, one or more segments, or any other quantity of information. The portion may represent a first period of time of the stream. The portion may be stored into a forward buffer at the client device. As shown in 610, the method may begin displaying the portion of video in the buffer on a display device associated with the client device. Displayed video may be removed from the buffer.

As shown in 620, the method may determine whether the stream includes a cue to initiate visualization. The cue may represent metadata in the stream that specifically requests the visualization, e.g., during a gap in an advertising slate or an unanticipated loss of the stream from the content provider. In one embodiment, the cue may represent a sequence of blanked or black frames that is sufficiently long in duration. The cue may also represent detection of a buffering event as discussed above. In one embodiment, the cue may represent a local (dent-side) decision to fail over to a different CDN, such that a temporary loss of streaming is anticipated and proactive metadata visualization is desired. If no such cue is detected, then the method may continue with the operation shown in 600.

If a cue for visualization is detected, then as shown in 630, the client may locally render an animation or visualization of metadata relevant to the stream. The client may display the animation or visualization on the display device instead of video from the stream. Such animations or visualizations may seek to maintain viewer engagement while video from the stream is not displayed. An animation or visualization may be generated or rendered dynamically, e.g., in response to the cue. An animation or visualization may include textual elements, graphical elements, or a combination thereof. An animation or visualization may be static or animated. An animation or visualization may be relevant to the specific content or nature of the stream. For example, if the interrupted stream is a live sporting event, then the player may generate and display a visualization of the current score or status, relevant statistics for the teams or athletes involved, real-time play-by-play of the event, scores for related events, and/or other relevant metadata. As another example, if the interrupted stream is a live news broadcast, then the player may generate and display a visualization of current news headlines. In various embodiments, the metadata that is visualized may be acquired by the player using an out-of-band call to a metadata server in response to the cue, may be seeded at the start of the stream, or may be extracted from the stream itself.

As shown in 640, the client may receive an additional portion of the stream from the media streaming system. While the additional portion is received, the animation or visualization may be displayed. The additional portion may represent one or more frames, one or more segments, or any other quantity of information. In one embodiment, the client may skip a portion of the stream between the portion referred to in 600 and the additional portion referred to in 640. The skipped portion may represent a second period of time of the stream, and the additional portion may represent a third period of time of the stream. The additional portion may be stored into the forward buffer at the client device.

As shown in 650, the method may determine whether the stream includes a cue to stop the visualization. The cue may represent metadata in the stream that specifically requests discontinuation of visualization, e.g., at the end of a gap in an advertising slate or an unanticipated loss of the stream from the content provider. The cue may also represent detection that a buffering event is over. If no such cue is detected, then the method may continue with the operation shown in 640. However, if the ending cue is encountered, then as shown in 660, the client may resume displaying the video from the stream and may discontinue displaying the animation or visualization.

Illustrative Computer System

In at least some embodiments, a computer system that implements a portion or all of one or more of the technologies described herein may include a computer system that includes or is configured to access one or more computer-readable media. FIG. 7 illustrates such a computing device 700. In the illustrated embodiment, computing device 700 includes one or more processors 710A-710N coupled to a system memory 720 via an input/output (I/O) interface 730. Computing device 700 further includes a network interface 740 coupled to I/O interface 730.

In various embodiments, computing device 700 may be a uniprocessor system including one processor or a multiprocessor system including several processors 710A-710N (e.g., two, four, eight, or another suitable number). Processors 710A-710N may include any suitable processors capable of executing instructions. For example, in various embodiments, processors 710A-710N may be processors implementing any of a variety of instruction set architectures (ISAs), such as the x86, PowerPC, SPARC, or MIPS ISAs, or any other suitable ISA. In multiprocessor systems, each of processors 710A-710N may commonly, but not necessarily, implement the same ISA.

System memory 720 may be configured to store program instructions and data accessible by processor(s) 710A-710N. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 720 as code (i.e., program instructions) 725 and data 726. In one embodiment, as shown in FIG. 7, system memory 720 stores program code and data that implement aspects of the client video player 170.

In one embodiment, I/O interface 730 may be configured to coordinate I/O traffic between processors 710A-710N, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processors 710A-710N). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processors 710A-710N.

Network interface 740 may be configured to allow data to be exchanged between computing device 700 and other devices 760 attached to a network or networks 750. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of at least one computer-readable (i.e., computer-accessible) medium configured to store program instructions and data as described above for implementing embodiments of the corresponding methods and apparatus. For example, system memory 720 may store program code and data associated with the client video player 170. In some embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 700 via I/O interface 730. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 700 as system memory 720 or another type of memory. Further, a computer-readable medium may include transmission media or signals such as electrical, electromagnetic, or digital signals, conveyed via a communication medium such as a network and/or a wireless link, such as may be implemented via network interface 740. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computing devices configured to implement a media streaming system, wherein the media streaming system is configured to:
      generate a video stream; and
   one or more computing devices configured to implement a client of the media streaming system, wherein the client is coupled to the media streaming system via one or more networks, wherein the client comprises a video buffer, and wherein the client is configured to:
      begin receiving the video stream from the media streaming system, wherein a most recently received portion of the video stream is stored in the video buffer;
      begin displaying the video stream from the video buffer on a display device, wherein a displayed portion of the video stream is removed from the video buffer;
      determine that the video buffer stores less than a threshold amount;
      based at least in part on the video buffer storing less than the threshold amount, generate an animation using metadata associated with the video stream, wherein the metadata is used, subsequent to said determine, to generate the animation;
      discontinue displaying the video stream on the display device and display the animation on the display device while the video stream is not displayed;
      store a newer portion of the video stream in the video buffer while the animation is displayed on the display device, wherein the newer portion is received from the media streaming system;
      determine that the video buffer stores at least the threshold amount while the animation is displayed on the display device; and
      based at least in part on the video buffer storing at least the threshold amount, discontinue displaying the animation on the display device and resume displaying the video stream from the video buffer on the display device.

2. The system as recited in claim 1, wherein the client is further configured to:
   play audio of the video stream while the animation is displayed on the display device.

3. The system as recited in claim 1, wherein the client is further configured to:
   obtain the metadata using an out-of-band call to a metadata server via the one or more networks.

4. The system as recited in claim 1, wherein the client is further configured to:
   extract at least some of the metadata from the video stream and include the extracted metadata in the animation.

5. A computer-implemented method performed by one or more computing devices, comprising:
   storing, by a client device, a portion of a video stream into a video buffer, wherein the video stream is received from a media streaming system via one or more networks, and wherein the portion of the video stream is displayed on a display associated with the client device;
   discontinuing, by the client device, displaying the video stream on the display;
   extracting metadata from the video stream;
   generating, by the client device, a visualization including at least some of the extracted metadata from the video stream, wherein the visualization of metadata is displayed on the display while the video stream is not displayed;
   storing, by the client device, a newer portion of the video stream in the video buffer while the visualization of metadata is displayed on the display;
   discontinuing displaying the visualization of metadata and resuming displaying the video stream on the display.

6. The method as recited in claim 5, further comprising:
   determining, by the client device, that the video buffer stores less than a threshold amount, wherein displaying the video stream is discontinued based at least in part on the video buffer storing less than the threshold amount; and
   determining, by the client device after storing the newer portion, that the video buffer stores at least the threshold amount, wherein displaying the visualization of metadata is discontinued and displaying the video stream is resumed based at least in part on the video buffer storing at least the threshold amount.

7. The method as recited in claim 5, further comprising:
   determining, by the client device, that the video stream comprises a cue to display the visualization, wherein displaying the video stream is discontinued based at least in part on the video stream comprising the cue.

8. The method as recited in claim 5, further comprising:
   continuing playback of audio of the video stream while the visualization of metadata is displayed.

9. The method as recited in claim 5, further comprising:
   obtaining the metadata using an out-of-band call to a metadata server via the one or more networks, wherein the visualization is generated using the metadata.

10. The method as recited in claim 5, wherein the visualization is generated based at least in part on a context associated with a user of the client device.

11. The method as recited in claim 5, wherein the visualization comprises a solicitation of user input, and wherein the method further comprises:
    receiving, by the client device, the user input;
    sending the user input to a metadata server via the one or more networks; and
    generating additional metadata based at least in part on the user input.

12. The method as recited in claim 5, wherein a portion of the video stream prior to the newer portion is not obtained by the client device.

13. The method as recited in claim 5, wherein the newer portion of the video stream is received by the client device at a lower bitrate than the portion of the video stream.

14. One or more non-transitory computer-readable storage media storing program instructions that, when executed on or across one or more processors, perform:
- storing, by a client device, a segment of a video stream into a video buffer, wherein the video stream is received from a media streaming system via one or more networks, and wherein the segment of the video stream is displayed on a display associated with the client device;
- determining, by the client device, that the video buffer is experiencing a buffering event;
- extracting metadata from the video stream; and
- generating, by the client device, a visualization to include at least some of the metadata extracted from the video stream;
- based at least in part on the buffering event, displaying the visualization on the display while the video stream is not displayed;
- storing, by the client device, a newer segment of the video stream in the video buffer while the visualization of metadata is displayed on the display;
- determining, by the client device after storing the newer segment, that the video buffer stores at least the threshold amount; and
- based at least in part on the video buffer storing at least the threshold amount, discontinuing displaying the visualization of metadata and resuming displaying the video stream on the display.

15. The one or more non-transitory computer-readable storage media as recited in claim 14, further storing program instructions that, when executed on or across one or more processors, perform:
- continuing playback of audio of the video stream while the visualization of metadata is displayed.

16. The one or more non-transitory computer-readable storage media as recited in claim 14, further storing program instructions that, when executed on or across one or more processors, perform:
- obtaining the metadata using an out-of-band call to a metadata server via the one or more networks; and
- generating the visualization using the metadata.

17. The one or more non-transitory computer-readable storage media as recited in claim 14, wherein a segment of the video stream prior to the newer segment is not requested or obtained by the client device.

18. The one or more non-transitory computer-readable storage media as recited in claim 14, wherein the newer segment of the video stream is requested and received by the client device at a lower bitrate than the segment of the video stream.

* * * * *